Nov. 5, 1963  R. M. WISE  3,109,337
TIRE AWLING APPARATUS
Filed Dec. 8, 1961  8 Sheets-Sheet 1
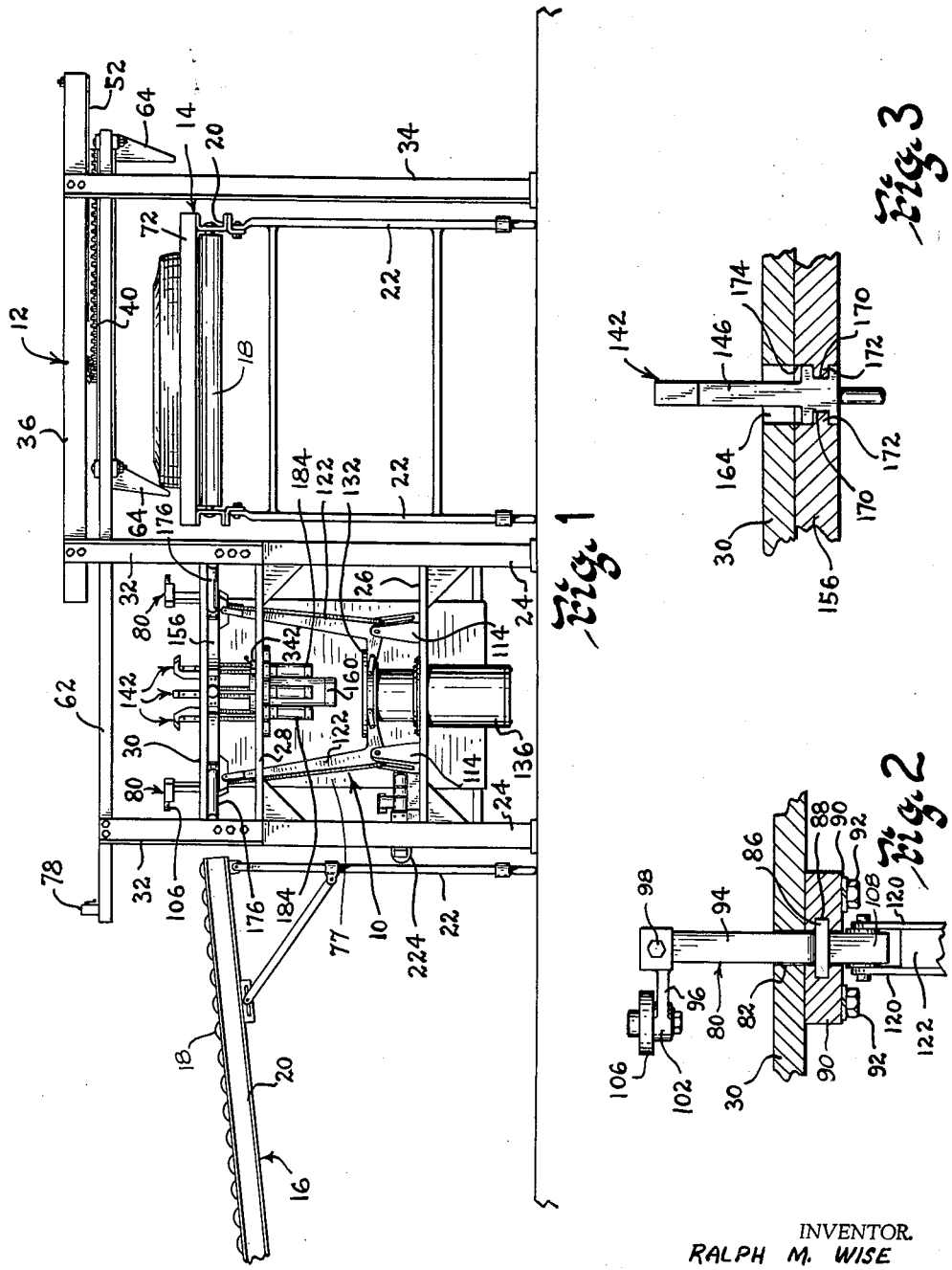
INVENTOR.
RALPH M. WISE
BY
Steward & Steward
his ATTORNEYS

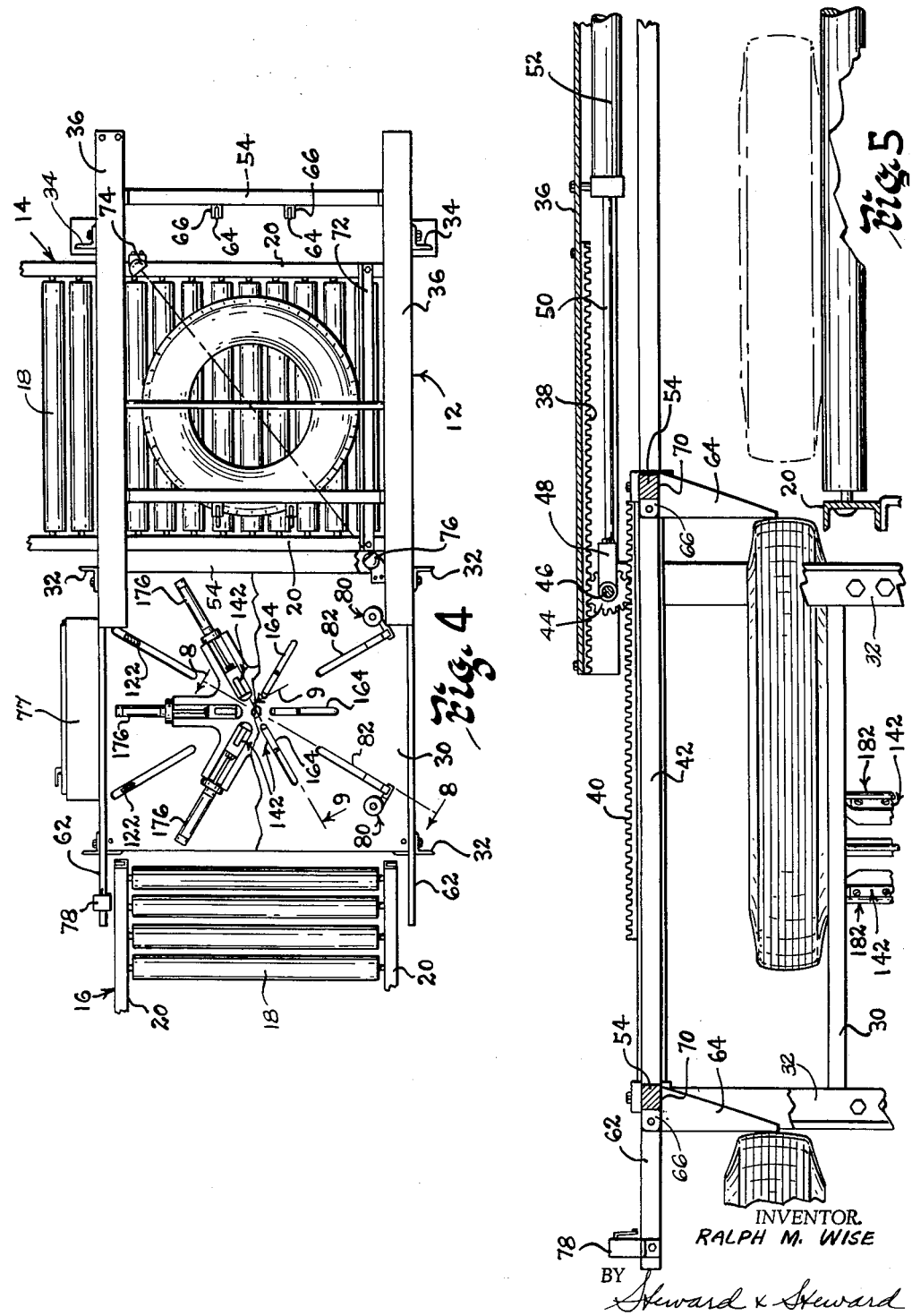

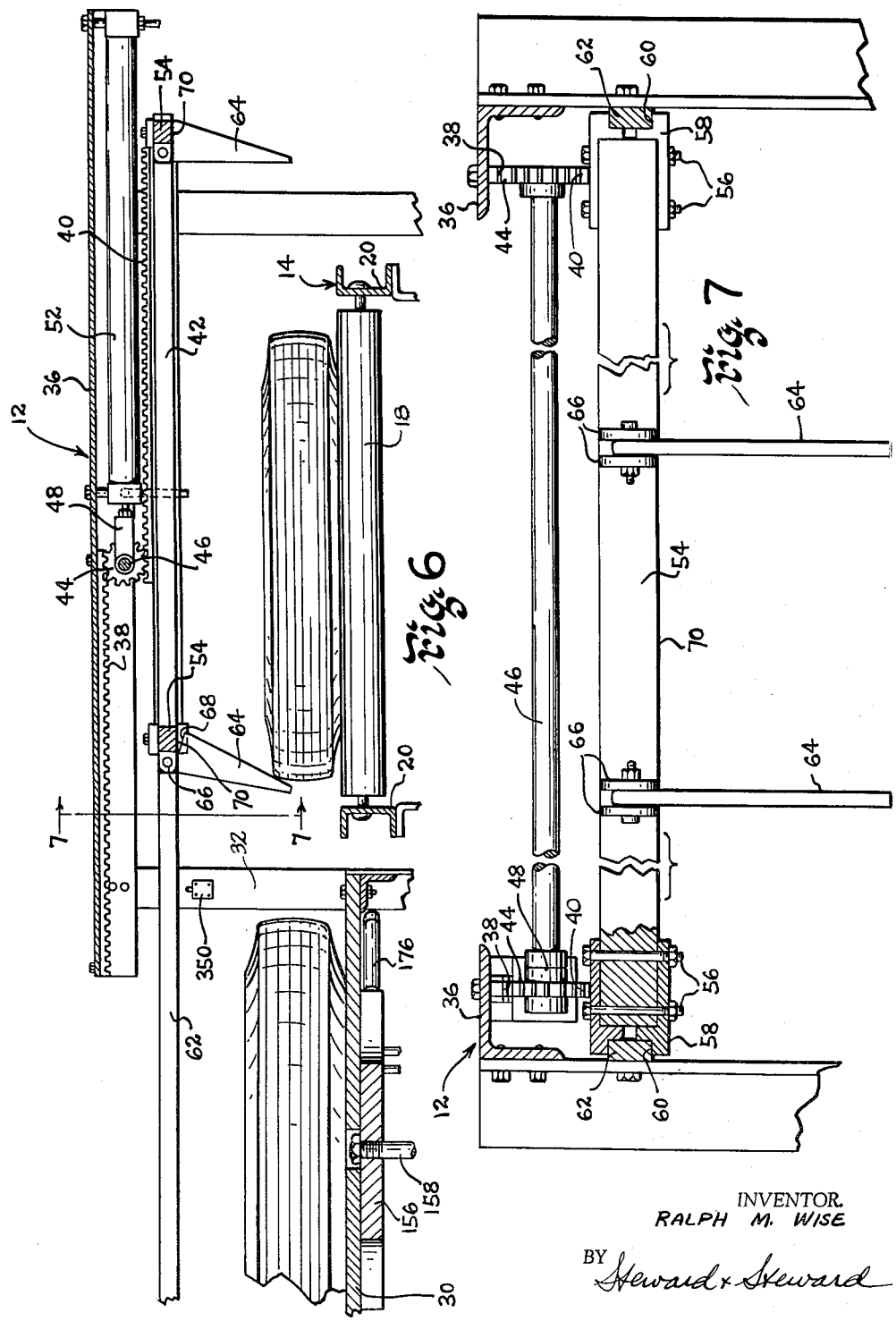

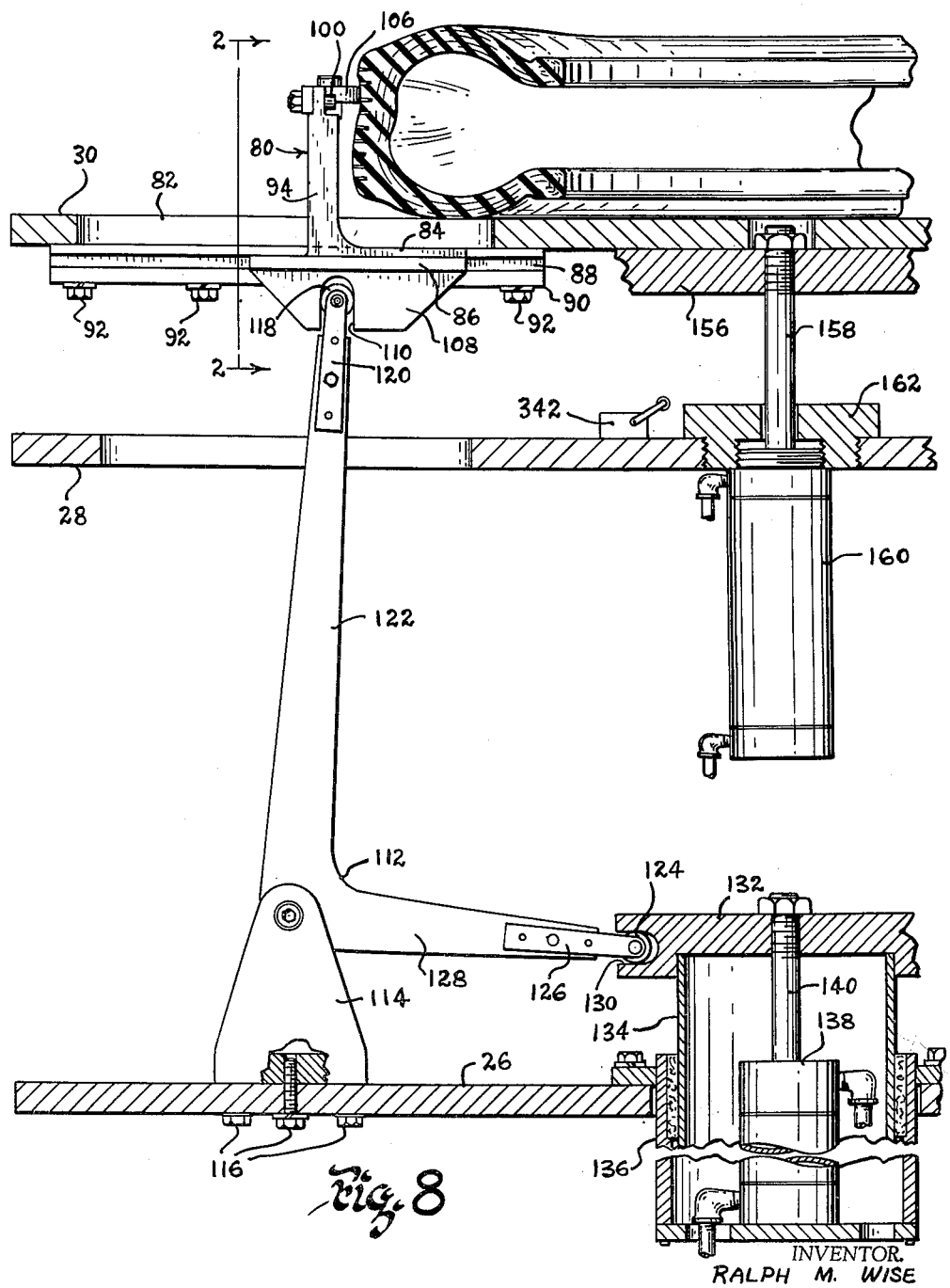

Nov. 5, 1963  R. M. WISE  3,109,337
TIRE AWLING APPARATUS
Filed Dec. 8, 1961  8 Sheets-Sheet 5
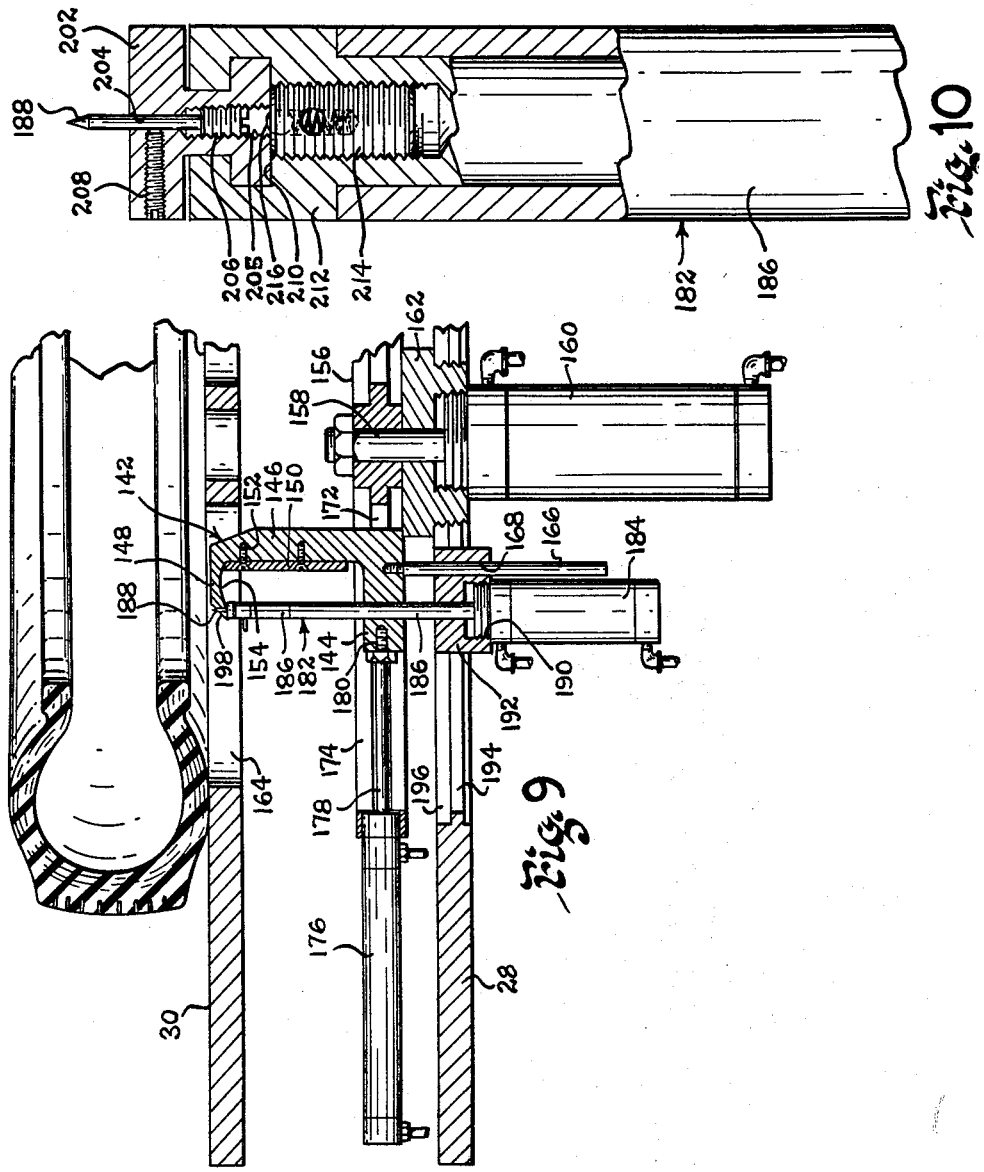
INVENTOR.
RALPH M. WISE
BY Steward & Steward
his ATTORNEYS Nov. 5, 1963   R. M. WISE   3,109,337
TIRE AWLING APPARATUS
Filed Dec. 8, 1961   8 Sheets-Sheet 6
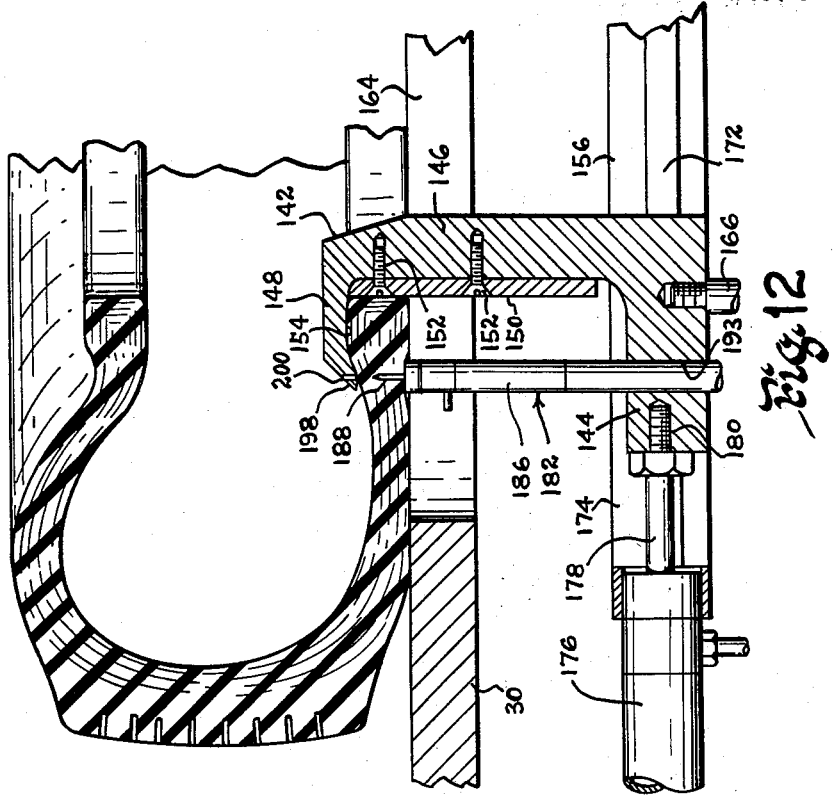
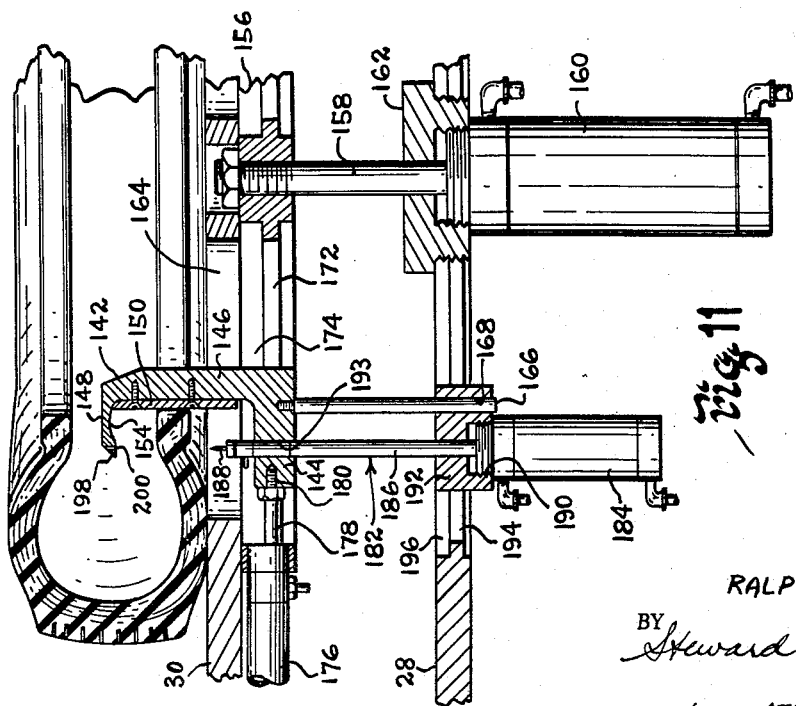
INVENTOR.
RALPH M. WISE
BY Steward & Steward
his ATTORNEYS

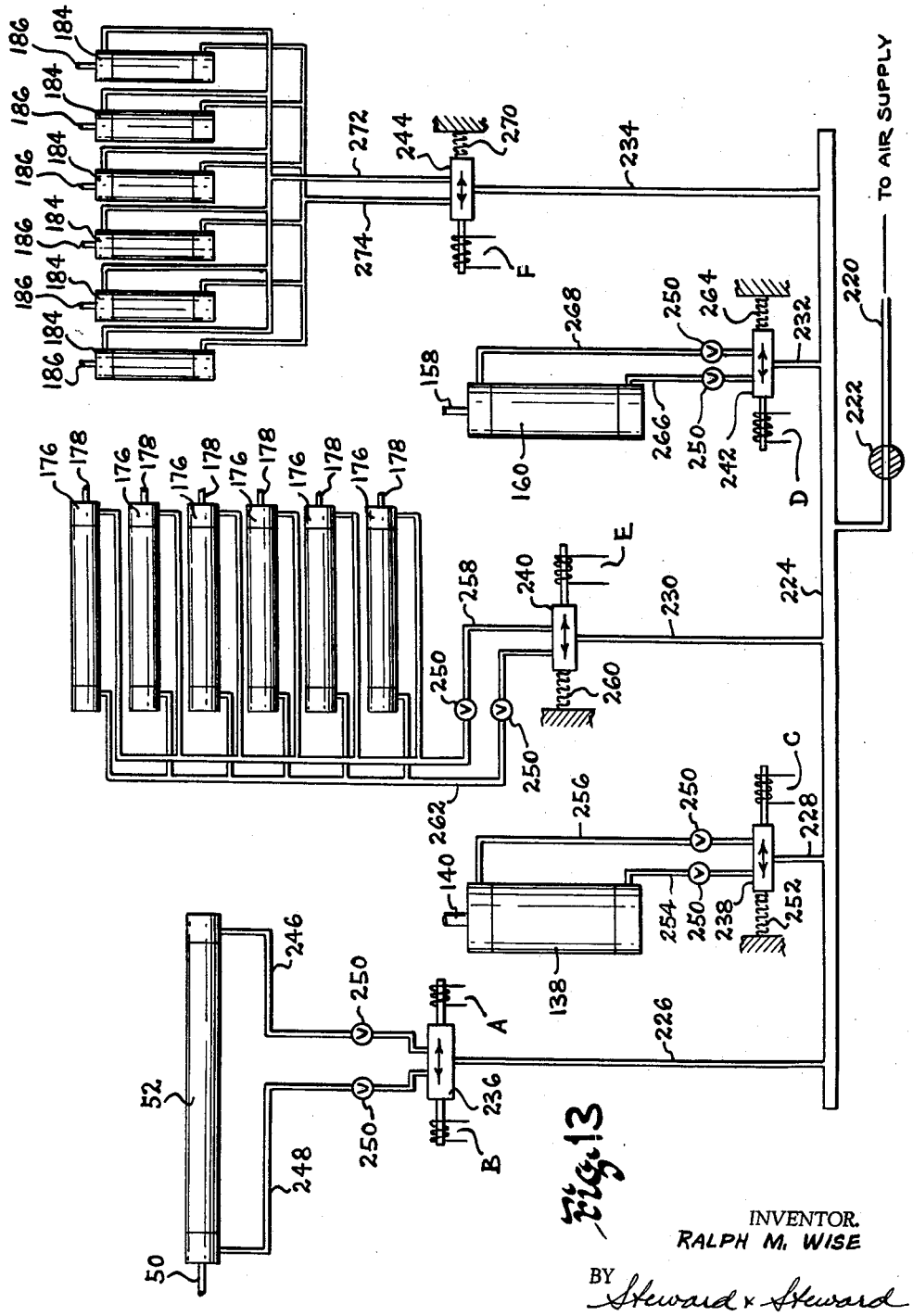

United States Patent Office 3,109,337
Patented Nov. 5, 1963

3,109,337
TIRE AWLING APPARATUS
Ralph M. Wise, Milford, Conn., assignor to The Armstrong Rubber Company, West Haven, Conn., a corporation of Connecticut
Filed Dec. 8, 1961, Ser. No. 158,011
4 Claims. (Cl. 83—2)

The invention relates to tire awling apparatus for making a number of tiny holes in an automobile tire adjacent an inner edge portion to vent any air that may seep between the plies.

It has been discovered in the tire manufacturing art that air sometimes becomes entrapped between the plies of the tire when the tire is put in use. This condition is called "wicking" and is caused by air under pressure within the tire leaking through the inner liner of the tire, if it is a tubeless type, or through the inner tube, if it is a tube type, into the fabric cord of the tire carcass. The air then creeps toward the bead of the tire where it forms pockets which weaken the tire and may cause blowouts. It has been found that by providing a plurality of tiny apertures in the region of the bead the air trapped between the plies of the tire is enabled to escape. In this manner the buildup of air pockets can be prevented.

Insofar as I am aware the awling of cured tires has heretofore been accomplished by an operator using either an electric drill to make each puncture individually or a special tool in which a number of awls are mounted on an annular ring and automatically actuated to simultaneously make the necessary punctures in the tire. In both methods the perforations are made in the uppermost edge portion of the tire as the tire lies upon a table. These prior known methods of awling cured tires have several disadvantages.

The method employing an electric drill is very slow as the operator must make approximately six punctures in each tire and it is not possible for an operator to keep up with the number of tires normally handled on the manufacturer's assembly line. In addition this method produces very erratic and non-uniform results both as to the positioning and spacing of the openings and also as to their depth and angle of penetration.

The use of an annular ring with a plurality of awls mounted on it constitutes an improvement over the electric drill in speed of operation and in uniformity in the spacing of the holes. However, the use of this apparatus is still subject to the disadvantages of non-uniform spacing of the apertures with respect to the inner edge of the tire and incorrect angling of the awls. Furthermore, such special tool jigs can only be used with one tire size. Accordingly, a special tool ring must be made for each tire size manufactured.

The present invention has for its object the utilization of an improved method for awling cured tires and the provision of one form of suitable apparatus for carrying out the improved method.

More particularly, it is an object of the invention to devise a method of awling cured tires that will insure uniform spacing and proper location of the air bleeding apertures as well as proper depth and angle of the holes. A further object of the invention is to provide an improved tire awling method that can be used on tires of all sizes without modification. Another object of the invention is to provide apparatus for automatically carrying out the method of the invention.

Briefly, the method of the invention comprises placing one side of a tire against a supporting surface, clamping the inner edge portion of the nearest side of the tire to the supporting surface and then perforating the nearest side of the tire through openings in the supporting surface at a number of equally spaced points adjacent to and at a uniform distance from the inner edge portion of the tire. While it is preferred to have the tire laid on its side on a horizontally disposed table this is not essential. The important aspect of the method is that the perforations are made in the side of the tire that is clamped to the supporting surface.

The apparatus of the invention comprises, in general, a supporting surface or table for the tires with a plurality of clamping members disposed to one side or below the supporting surface. Centering means may be provided to align each tire on the surface so that the inner opening circumscribed by the tire is aligned with the clamping members. Actuating means on the apparatus then sequentially extend the clamping members beyond the surface or table, move them radially outwardly beyond the inner edge portion of the tire and bring the members inwardly against the supporting surface to clamp the inner edge portion of the nearest side of the tire against the table. When the tire is so clamped a plurality of annularly disposed awls are driven through suitable openings in the surface into the tire to perforate the inner edge portion.

For the purpose of illustrating one form in which the invention may be made and used a presently preferred apparatus for carrying out the method of the invention is shown in the accompanying drawings and will be described in detail hereinafter. It is to be understood, however, that the invention is not limited to this specific construction which is shown by way of example only and nothing in the description of this embodiment of the invention is intended to define or restrict the scope of the invention. The claims appended hereto are relied upon for that purpose.

Of the drawings:

FIG. 1 is an elevational view of a presently preferred apparatus showing the general organization of the parts, except that the various hose connections for the pressure fluid actuated parts have been omitted for the sake of clarity;

FIG. 2 is a detail view, partly in section, showing one of the tire centering arms and the manner of its mounting on the apparatus;

FIG. 3 is a detail view, partly in section, showing one of the tire clamping arms and the manner of its mounting on the apparatus;

FIG. 4 is a plan view of the apparatus, with the top table surface partly broken away to shown the structure just below it;

FIG. 5 is an enlarged sectional view showing the tire feeding mechanism of the apparatus in the act of advancing the tires;

FIG. 6 is an enlarged sectional view similar to FIG. 5 showing the tire feeding mechanism in its retracted position;

FIG. 7 is a transverse sectional view taken along the line 7—7 in FIG. 6 looking in the direction of the arrows;

FIG. 8 is a transverse sectional view, greatly enlarged, taken along the line 8—8 in FIG. 4 looking in the direction of the arrows;

FIG. 9 is an enlarged transverse sectional view taken along the line 9—9 in FIG. 4 looking in the direction of the arrows;

FIG. 10 is an enlarged detail view, partly in section, showing the construction of the tire awls;

FIG. 11 is an enlarged sectional view showing a tire clamping member just before the start of its downward clamping stroke;

FIG. 12 is an enlarged sectional view similar to that of FIG. 11 showing the awling of the clamped tire;

FIG. 13 is a schematic diagram of the pressure fluid actuating system of the apparatus.

Figure 14:
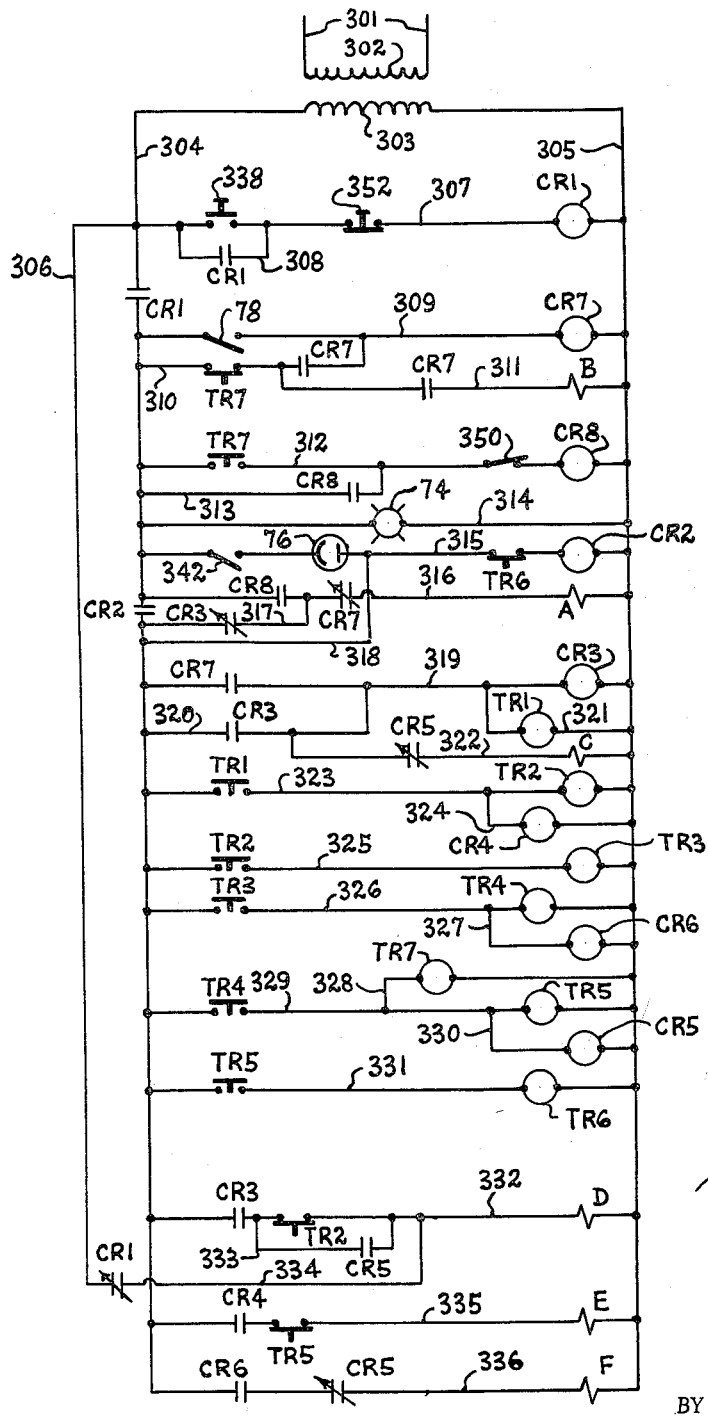
FIG. 14 is a schematic diagram of the electrical control system of the apparatus.

The preferred apparatus for carrying out the method of the invention is shown generally in FIGS. 1 and 2 and comprises a tire awling device 10 and a feeding mechanism 12 for moving the tires from a first conveyor 14 onto the tire awling device and for removing the tires from the awling device to a second conveyor 16 that carries the tires away from the apparatus after the awling operation. The first and second conveyors 14 and 16, respectively, are shown as being of the gravity type consisting of a plurality of freely rotatable rollers 18, 18 mounted between parallel channel bars 20, 20 that are supported in a sloping attitude by suitable stanchions 22, 22. Delivery to and removal of the tires from the tire awling apparatus can thereby be effected without requiring power driven conveyor equipment and this fact permits the apparatus to be quickly installed in a tire conveyor line at whatever point is most convenient.

Four vertical angle iron supports 24, 24 serve as the corner braces for three horizontally disposed platforms or supporting surfaces 26, 28 and 30 that make up a table-like frame for the tire awling device 10. At their upper ends the angle iron supports 24, 24 are provided with extensions 32, 32 which, together with an additional pair of angle iron supports 34, 34, serve to support the horizontal frame members of the tire feeding mechanism 12.

The tire feeding mechanism 12 comprises a pair of parallel horizontally disposed angle irons 36, 36 bolted to the supports 32 and 34. A pair of gear racks 38, 38 are secured to the underside of the top flanges on the angle irons 36, 36 at the ends nearest the tire awling device 10. Another pair of gear racks 40, 40 are secured to the top of the tire feeding carriage 42 in line with the gear racks 38, 38 on the angle irons 36, 36 so as to present two pairs of opposed sets of gear racks.

A pinion gear 44 is positioned between each set of opposed gear racks 38, 40 so as to mesh with both gear racks. These pinion gears 44 are mounted at opposite ends of a cross rod 46 that interconnects the gears for simultaneous advancement. One pinion gear (that shown in FIG. 5) is fixed to a yoke 48 at the end of a piston rod 50 of a pressure fluid actuated cylinder 52 secured to the underside of the flange of the angle iron 36 and is reciprocably moved thereby. Forward movement of the piston rod 50 (to the left as seen in FIG. 5) serves to rotate the pinion gears 44, 44 relative to the upper gear racks 38, 38 thereby causing the lower gear racks 40, 40 to move forwardly relative to the pinion gears 44, 44. Since the lower gear racks 40, 40 are secured to the slidable tire feeding carriage 42 the entire carriage assembly is moved forwardly by this movement of the pinion gears.

The tire feeding carriage 42 comprises a pair of parallel cross pieces 54, 54 that are secured at their ends by means of bolts 56, 56 within channel shaped side brackets 58, 58. Recesses 60, 60 are formed in the outer sides of the brackets 58, 58 which enable the brackets to be slidably mounted on parallel, horizontal bars 62, 62. The bars 62, 62 are secured to the angle bar supports 32, 32, 34 and serve as a track for the reciprocable sliding movement of the carriage.

Each cross piece 54 carries two downwardly extending tapered fingers 64, 64 that are pivotally mounted between brackets 66, 66 on the front face of the cross piece. The tops 68, 68 of the fingers 64, 64 extend rearwardly of the front faces of the cross piece and normally abut against the undersides 70, 70 of the pieces to limit rearward pivotal movement of the fingers. In this position the front edges of the fingers 64, 64 are substantially vertical and extend downwardly to intercept any tires that may be in the path of movement of the carriage. Inasmuch as further rearward pivoting of the fingers 64, 64 is not possible any tires so intercepted by the fingers during the forward movement of the carriage will be pushed along with the carriage. Thus, a tire lying on the first conveyor 14 between the front and rear sets of fingers 64, 64 will be pushed onto the awling table 30 by the forward movement of the carriage while a tire lying on the awling table in front of the first set of fingers 64, 64 will be pushed onto the second conveyor 16. During rearward movement of the carriage (movement to the right as seen in FIG. 6) the front set of fingers 64, 64 upon engagement with the tire just advanced onto the awling table, pivot forwardly with respect to the carriage until they can slide over the tire.

The cycle of operation of the tire feeding mechanism 12 is initiated by the arrival of a tire at the tire stop 72 of the first conveyor 14. As the tire passes along the conveyor 14 to this point it passes through and interrupts a beam of light between a light source 74 and a photoelectric cell 76. The interruption of the light beam actuates the electrical control panel 77 for the apparatus and, in a manner to be described in greater detail hereinafter, valves pressure fluid to the cylinder 52. When the carriage 42 has completed its forward movement it contacts a switch 78 located at the end of one track 62 and the electrical control circuit for the mechanism is reversed and the carriage returns to its original position. The location of the switch 78 is such as to stop the forward movement of the carriage when the tire is approximately at the center of the awling table 30.

The tire is centered after it has been pushed onto the awling table 30 by the feeding mechanism 12. Centering of the tire is done by four radially movable arms 80, 80 that simultaneously move inwardly on the tire to properly position it. Four radially disposed slots 82, 82 are formed in the top of the awling table 30 to permit the inward radial movement of the arms.

Each centering arm 80 comprises a slidable base portion 84 having laterally extending tongues 86, 86 at the sides that fit within correspondingly shaped grooves 88, 88 formed in a pair of slide members 90, 90 fixed to the underside of the table 30 by means of machine screws 92, 92. The top of each base is shaped to form an upright bar 94 that extends above the table through the slots 82, 82. A laterally extending bracket arm 96 is fixed to the top of each bar 94 by a nut 98 and bolt 100 and the outer ends of the bracket arms form bosses 102, 102 in which short vertical shafts are mounted. Small horizontally disposed wheels 106, 106 are mounted on the shafts just above the bosses 102, 102.

The base portions 84, 84 of the centering arms 80, 80 are formed with downwardly extending webs 108, 108 and vertical openings 110, 110 are provided in the webs to accommodate the upper ends of connecting bell cranks 112, 112. The bell cranks 112, 112 are pivotally mounted in U-shaped brackets 114, 114 secured by machine screws 116, 116 to the lowermost platform 26 of the awling device 10. Rollers 118, 118 are mounted between two plates 120, 120 fixed to the upper ends 122, 122 of the bell cranks 112, 112 and are disposed in the openings 110, 110 in the webs 108, 108 of the centering arms 80, 80.

At their opposite ends the bell cranks 112, 112 are similarly provided with rollers 124, 124 rotatably mounted between plates 126, 126 fixed to the lower ends 128, 128 of the bell cranks 112, 112. The rollers 124, 124 are disposed within a horizontal groove 130 formed in the head 132 of a vertically reciprocable sleeve 134 that slides within a stationary housing 136 secured to the lowermost platform 26. Sliding movement of the head 132 and sleeve 134 is effected by a pressure fluid cylinder 138 located within the housing. The head 132 is threaded to the free end of the piston rod 140 of the cylinder and moves up and down in accord with the movement of the piston within the cylinder 138. Upward movement of the piston rod 140 and the sleeve 134 pivots the upper arms 122, 122 of the bell cranks 112, 112 outwardly from the center of the awling table 30 to retract the centering arms 80, 80. Downward movement of the sleeve 134 pivots the upper arms 122, 122 of the bell cranks 112, 112 inwardly and moves the centering arms 80, 80 inwardly against the tire. During the centering action the wheels 106, 106 permit the tire to move laterally if necessary.

At the same time that the tire feeding mechanism 12 is returning to its original position and the centering arms 80, 80 are centering the tire on the table the mechanism for clamping the tire to the awling table is starting to move into position. Clamping of the tire to the table 30 is effected by a number of clamping members or dogs 142, 142 located below the center of the table. The clamping dogs 142, 142 are generally C-shaped having a base portion 144, an upstanding arm 146 and a laterally extending hook 148. Filler plates 150 are secured to the inner faces of the upstanding arm portions 146 by screws 152, 152 and the underside 154 of the hook 148 is provided with a curvature that corresponds to the inside curvature of the bead of the tire.

The clamping dogs 142, 142 are carried by a spider 156 positioned underneath the awling table 30 that, like the sleeve 134, is vertically reciprocable in response to the movement of the piston rod 158 of a pressure fluid actuated cylinder 160. The cylinder 160 is threaded in a locking nut 162 that, in turn, is threaded into the intermediate platform or supporting surface 28 of the awling device 10. Vertical movement of the piston raises the clamping dogs 142, 142 upwardly through accommodating radial slots 164, 164 in the top table or platform 30. Proper alignment of the dogs 142, 142 with the slots 164, 164 is insured by guided pins 166, 166 that extend downwardly from the dogs into guide openings 168, 168 in the platform.

The clamping dogs 142, 142 are slidably movable in the spider 156 in a radial direction. As best shown in FIG. 3, grooves 170, 170 on opposite sides of the base portions 144 permit the clamping dogs to slide along tongues 172, 172 formed in the sides of radially disposed slots 174, 174 in the spider 156. In their uppermost position the clamping dogs 142, 142 extend above the lower bead of the tire as it lays on the table top 30. After the dogs 142, 142 have reached this position they are moved radially outward against the inner edge of the tire.

It should be noted here that in the case of certain tires, more particularly the new two-ply tires, the sidewalls of the tire may be sufficiently flexible to permit the upper bead to rest on the lower bead when the tire lies horizontally. If this should occur dogs 142, 142 would in all probability extend above both beads of the tire so that when the dogs are moved outwardly against the inner edge of the tire, both beads could presumably lie within the hook portion 148 and be gripped thereby when the dogs are lowered in the manner hereinafter described. In order to avoid this situation, sufficient pressure is applied to the periphery or tread portion of the tire by means of centering arms 80, 80 to separate the bead, so that when the dogs 142 are moved outwardly, their hook portions 148 enter the tire between the beads as shown in FIG. 11.

Outward movement of the dogs is effected by a number of pressure fluid actuated cylinders 176, 176 secured to the outer ends of the spider 156, there being one cylinder for each clamping dog. The piston rods 178, 178 for the pressure fluid cylinders 176, 176 are each threaded to the outer end of the base portion 144 of the corresponding dog as is shown at 180 so that the movement of the piston inside the cylinder slides the dog along the tongues 172, 172 in the radially disposed slots 174, 174 in the spider 156.

After the clamping dogs 142, 142 have been moved outwardly against the lower bead of the tire the flow of pressure fluid to the cylinder 160 for the spider 156 is reversed. This causes the piston rod 158 to retract and lower the spider. Downward movement of the spider 156 causes the clamping dogs 142, 142 to clamp the lower bead and side wall of the tire against the table top 30 as is seen in FIG. 12.

When the tire is firmly clamped against the awling table 30 it is ready for the awling operation. Awling of the tire is done by pressure fluid actuated awls 182, 182. Each awl 182 comprises a pressure fluid actuating cylinder 184, an internal piston (not shown), and a piston rod 186 to which the awling pin 188 is secured. The cylinders 184, 184, as is shown at 190 are threadedly secured to mounting blocks 192, 192 that are slidably movable on a pair of tongues 194, 194 at the side surface of accommodating slots 196, 196 formed in the intermediate platform 28. The piston rods 186, 186 for the awls extend upwardly through openings 193, 193 in the base portions of the clamping dogs and the clearance between the openings 193, 193 and the rods 186, 186 is sufficient for a sliding fit. When the spider 156 is in its lowermost position the piston rods 186, 186 extend well beyond the bases 144, 144 of the clamping dogs 142, 142 and abut against the undersides of the points 198, 198 of the dogs. In this position the awling pins 188, 188 fit within small openings 200, 200 formed in the points of the dogs.

The awling pins 188, 188 are mounted in the piston rods 186, 186 by securing the pins to T-shaped collars 202, 202. Each pin 188 is inserted into an opening 204 in the collar 202 until it abuts an adjusting screw 206. A set screw 208 holds the pin 188 in place. The lower portions of the collars 202 slide within T-shaped slots 210 formed in the upper portions of intermediate holders 212, 212. Internally the holders 212, 212 have threaded plugs 214, 214 in which there are provided spring loaded detents 216, 216 which engage the central openings 205, 205 for the adjusting screws 206, 206 to hold the collars 202, 202 in the holders. In turn, the holders 212, 212 are threaded into the piston rods 186, 186 at a point not shown in the drawings.

The pressure fluid system for actuating the apparatus is schematically shown in FIG. 13. In the form of the invention shown in the drawings the pressure fluid is compressed air. It is to be understood, however, that hydraulic fluid under pressure could also be used.

Compressed air is drawn from a suitable source of supply (not shown) through a supply pipe 220. A shut-off valve 222 controls the air flow in the pipe from the source of air to a storage header 224. The storage header 224 is connected to each of the pressure fluid actuated cylinders of the apparatus by branch supply lines 226, 228, 230, 232 and 234 which are provided with solenoid operated valves 236, 238, 240, 242 and 244 that valve pressure fluid to one side or the other of the pressure fluid actuated cylinders.

Branch supply line 226 supplies compressed air to the cylinder 52 that advances and retracts the tire feeding carriage. The control valve 236 for this branch is operated by two solenoids A and B. When the solenoid A is energized compressed air is valved to the rear end of the cylinder 52 through the line 246 and the piston rod 50 and tire feeding carriage are moved forwardly, or to the left as seen in FIG. 13. When the solenoid B is energized compressed air is valved to the front end of the cylinder 52 through the line 248 and the piston rod 50 and tire feeding carriage are moved rearwardly, or to the right as seen in FIG. 13. Adjustable flow valves 250, 250 between the solenoid operated valve 236 and the cylinder 52 are provided so that the timing of the piston rod stroke may be adjusted.

Branch supply line 228 supplies compressed air to the actuating cylinder 138 that moves the centering arms 80, 80 inwardly and outwardly of the center of the awling table 30. The control valve 238 for this branch is operated by a single solenoid C that serves to move an internal piston (not shown) leftwardly against the tension of a spring 252 constantly urging the piston to the left. When solenoid C is not energized the spring 252 controls and compressed air is valved to the lower end of the cylinder 138 through the line 254. This raises the piston rod 140 and the head 132 that is secured to it pivoting the bell cranks 112, 112 and moving the centering arms 80, 80 outwardly in the slots 82, 82. Energization of solenoid C valves compressed air to the upper end of the cylinder 138 through the line 256 and retracts the piston and head 132. This pivots the bell cranks 112, 112 in the opposite direction and moves the centering arms 80, 80 inwardly toward the center of the awling table 30. As in branch 226, adjustable flow valves 250, 250 are provided between the control valve 238 and the cylinder 138.

Branch supply line 230 supplies compressed air to the cylinders 176, 176 that move the clamping dogs 142, 142 inwardly and outwardly with respect to the awling table 30. A spring biased solenoid control valve 240 is provided as in the case of branch 228. Solenoid E when energized valves compressed air to the forward ends of the cylinders 176, 176 through the line 258 and moves the piston rods 178, 178 and the clamping dogs 142, 142 outwardly. When solenoid E is not energized the spring 260 controls the valve 240 and compressed air is valved to the back ends of the cylinders 176, 176 through the line 262. The clamping dogs 142, 142 are then moved inwardly. Both the lines 258 and 262 are provided with adjustable flow valves 250, 250.

The branch supply line 232 supplies compressed air to the actuating cylinder 160 for the spider 156. As in the case of branch lines 228 and 230 a spring biased solenoid control valve 242 is provided in the line. Normally, the spring 264 positions the valve so as to send compressed air to the upper end of the cylinder 160 through the line 268. This moves the piston rod 158 and spider 156 downwardly. When the solenoid D is energized compressed air is valved to the lower end of the cylinder 160 through the line 266 to move the piston rod 158 and spider upwardly. Flow adjusting valves 250, 250 are also provided in the lines 266 and 268.

Branch supply line 234 supplies compressed air to the actuating cylinders 184, 184 for the awls 182, 182. A spring biased solenoid control valve 244 is provided in the line. Normally, the spring 270 controls the position of the valve so that compressed air is valved to the upper ends of the cylinders 184, 184 through the line 272 to depress the piston rods 186, 186 and awls 182, 182. When solenoid F is energized, the position of the valve 244 is changed and compressed air is valved to the lower ends of the awling cylinders 184, 184 through the line 274. This raises the piston rods 186, 186 and drives the awling pins 188, 188 upwardly into the tire.

The electrical control circuitry for the apparatus is shown in FIG. 14. Power at 440 volts is supplied through the lines 301, 301 to the primary winding 302 of a transformer where the voltage is stepped down to 110 volts in the secondary winding 303. The secondary winding 303 is connected between the main lines 304, 305 and 306 of the control circuit. A number of branch circuits 307–336 are connected between the main lines for sequentially controlling the functioning of the apparatus through the control of the solenoid operated valves 236–244 in the pressure fluid system.

When the primary winding 302 of the transformer is energized the secondary winding 303 and the connected control circuit is energized. A complete circuit is made immediately through the lines 304, 306, normally closed contact CR1, and branch lines 334 and 332 to the other side of the circuit, line 305. This circuit energizes solenoid D which causes the cylinder 160 to raise the clamping dogs 142, 142 to their uppermost position. The purpose of raising clamping dogs 142, 142 at this point is to disengage their points 198, 198 from awling pins 188, 188 in order that said pins can be inspected and any broken ones replaced.

In order to set up the machine for automatic operation, the manual reset button 338 in branch circuit 307 is pushed, completing a circuit through this branch and energizing relay CR1. Energization of the relay CR1 closes the normally open contact CR1 in branch circuit 308, thus completing a holding circuit to maintain energization of the relay CR1 after the reset button 338 is released. Relay CR1 also opens the normally closed contact CR1 in branch circuit 334, breaking the circuit through branch 332 and de-energizing the solenoid D. The fluid control valve 242 is then actuated by the spring 264 to valve pressure fluid to the upper end of the cylinder 160 to lower the clamping dogs 142, 142 below the table 30.

Energization of relay CR1 also closes the normally open contact CR1 in the main line 304 between branch circuits 307 and 309. Closing of this contact completes a circuit through branch 314 and lights the lamp 74 in the photoelectric sensing system at conveyor 14. At the same time the lowering of the spider 156 carrying the clamping dogs 142, 142 results in the closing of a limit switch 342 in branch circuit 315. As illustrated in FIG. 8, switch 342 is mounted on the intermediate platform 28 and is engaged by the spider 156 in its lowermost position. Closing of the switch 342 completes a circuit to the photoelectric cell 76 and places the branch circuit 315 in a condition to be completed upon interruption of the light beam. This occurs whenever a tire on the first conveyor 14 passes between the lamp 74 and the photoelectric cell 76.

When this happens the branch circuit 315 is completed and the control relay CR2 is energized. Energization of control relay CR2 closes the normally open contact CR2 positioned in line 304 between branch circuits 316 and 317. Closing of the contact CR2 completes a holding circuit through branch circuit 318 that maintains circuit 315 after the beam on the photoelectric cell 76 is again established. Closing of the contact CR2 also makes a circuit through the normally closed contact CR3 in branch circuit 317 and the normally closed contact CR7 in branch circuit 316. Completion of this circuit energizes the solenoid A causing the fluid control valve 236 to direct pressure fluid to the rearward end of the cylinder 52 for the tire feeding carriage 12 to advance the carriage and the tire laying on the first conveyor.

The cylinder 52 continues to advance the tire feeding carriage 12 until the carriage contacts the limit switch 78 (FIGS. 4 and 5) in branch circuit 309. Closing of this switch completes the circuit through control relay CR7. The relay CR7 closes a normally open contact CR7 in branch circuit 310 to establish a holding circuit for the relay after the carriage has moved away from the limit switch 78. Relay CR7 also closes the normally open contact CR7 in branch circuit 311 and energizes the solenoid B. With this solenoid energized the valve 236 is moved to direct pressure fluid to the forward end of the cylinder 52 so as to retract the tire feeding carriage. Concomitantly with the energizing of the solenoid B the relay CR7 opens the normally closed contact CR7 in branch circuit 316 and de-energizes solenoid A. The relay CR7 also closes the normally open contact CR7 in branch circuit 319. This completes a circuit through control relay CR3.

Energizing control relay CR3 opens the normally closed contact CR3 in branch circuit 317 interrupting the holding circuit for branch 316. It also closes the normally open contact CR3 in branch circuit 320 in order to establish a holding circuit for branch circuit 319, and at the same time closes the normally open contact CR3 in branch circuit 332. The closing of this latter contact re-establishes a circuit through solenoid D and valves pressure fluid to the lower end of the cylinder 160 thus raising the clamping dogs 142, 142. At the same time the closing of contact CR3 in circuit 320 establishes a circuit through the normally closed contact CR5 in branch 322 and energizes solenoid C. Solenoid C positions the fluid control valve 238 so as to valve pressure fluid to the upper end of the cylinder 138. This retracts the head 132, pivoting the bell cranks 112, 112 inwardly and moving the centering arms 80, 80 in on the tire to center it on the awling table.

When a circuit is established through the branch 319 by control relay CR7, as hereinbefore described, a circuit is also established through branch 321 so that a timing relay TR1 is energized simultaneously with control relay CR3. After the timing relay TR1 has timed out it will close the normally open contact TR1 in branch 323 thereby simultaneously completing branch circuits 323 and 324 and energizing timing relay TR2 and control relay CR4.

Control relay CR4 will immediately close the normally open contact CR4 in branch circuit 335 and complete a circuit through the normally closed contact TR5 and solenoid E. Solenoid E will thereupon move the fluid control valve 240 to direct pressure fluid to the inner ends of the cylinders 176, 176 to cause the cylinders to move the dogs 142, 142 outwardly against the bead portion of the tire, as shown in FIG. 11.

When the timing relay TR2 has timed out, it will open the normally closed contact TR2 in branch circuit 332 and de-energize solenoid D. The de-energizing of solenoid D will result in the spring 264 positioning the fluid control valve 242 so as to direct pressure fluid to the upper end of the cylinder 160. The spider 156 and clamping dogs 142, 142 will be lowered, and since the hooks 148 of the clamping dogs now extend outwardly between the bead portions of the tire, the dogs will clamp the lower bead and side walls of the tire to the awling table 30 (FIG. 12).

Timing relay TR2 will also close the normally open contact TR2 in branch circuit 325 thereby completing a circuit through timing relay TR3. When, in turn, relay TR3 has timed out, the normally open contact TR3 in branch 326 will be closed completing a circuit through timing relay TR4 and control relay CR6 in branch circuit 327.

Upon energization of control relay CR6 the normally open contact CR6 in branch circuit 336 is closed and the solenoid F in that circuit is energized. Solenoid F moves the fluid control valve 244 to a position where pressure fluid is valved to the lower ends of the awl actuating cylinders 184, 184 and the awling pins 188, 188 are driven upwardly into the tire, as shown in FIG. 12.

As soon as timing relay TR4 in branch 326 times out the normally open contact TR4 in branch circuit 329 will close. Closing of this contact completes a circuit through the timing relay TR7 in branch 328, the timing relay TR5 in branch 329 and the control relay CR5 in branch 330.

Control relay CR5 will immediately open the normally closed contact CR5 in branch circuit 336 and de-energize solenoid F. Fluid control valve 244 will then come under the influence of the spring 270 and will valve pressure fluid to the upper ends of the cylinders 184, 184 to retract the awls 182, 182.

Energizing of the control relay CR5 also closes the normally open contact CR5 in branch circuit 333. This re-establishes the current through circuit 332 and solenoid D. Solenoid D thereupon operates the fluid control valve 242 to reverse the flow of pressure fluid to the cylinder 160 and raise the spider 156 and the clamping dogs 142, 142.

The control relay CR5 also opens the normally closed contact CR5 in branch circuit 322 interrupting the flow of current to solenoid C. Upon the de-energization of solenoid C the spring 252 positions the fluid control valve 238 so as to valve pressure fluid to the lower end of the cylinder 138. This causes the head 132 to raise, pivoting the bell cranks 112, 112 outwardly to retract the centering arms 80, 80.

When the timing relay TR5 times out it opens the normally closed contact TR5 in branch circuit 335. The opening of the contact TR5 de-energizes solenoid E. Spring 260 then positions the flow control valve 240 to valve pressure fluid to the outer ends of the cylinders 176, 176, thereby moving the clamping dogs 142, 142 inwardly toward the center of the table. Timing relay TR5 also closes the normally open contact TR5 in branch circuit 331, which completes the circuit through the timing relay TR6 for a purpose which will be described hereinafter.

Timing relay TR7 in branch circuit 328 acts contemporaneously with timing relay TR5 and, after it has timed out, opens the normally closed contact TR7 in branch circuit 310, disrupting the current flow in circuits 309 and 311 deenergizing the control relay CR7 and solenoid B. The de-energizing of control relay CR7 opens the contact CR7 in branch circuit 319 but this does not interrupt the circuit through control relay CR3 as this is sustained by the holding circuit 320.

At the same time, the timing relay TR7 closes the normally open contact TR7 in branch circuit 312, thereby energizing control relay CR8. Control relay CR8, in turn, closes normally open contact CR8 in branch circuit 316. Due to the prior de-energizing of control relay CR7 in branch 309 by the opening of the contact TR7 in branch 310, the normally closed contact CR7 in branch 316 is closed and the closing of contact CR8 completes a circuit through the branch and energizes solenoid A. Solenoid A thereupon reverses the fluid control valve 236 and the flow of pressure fluid to the cylinder 52. The tire feeding carriage 12 therefore again starts to move forward.

In the meantime timing relay TR6 has been timing out, and at the end of its time interval opens the normally closed contact TR6 in branch 315 and de-energizes control relay CR2. The de-energization of relay CR2 opens the contact CR2 in main line 304 and interrupts the flow of current in all the branch circuits 317 through 336. Solenoid D is accordingly again de-energized, causing the flow control valve 242 to reverse cylinder 160 and lower clamping dogs 142, 142 below the awling table 30.

A contact 350 in branch circuit 312 is mounted on the tire feeding carriage 12 and is opened just before the carriage makes contact with the awled tire. Opening of this contact de-energizes control relay CR8 and opens the contact CR8 in branch circuit 316. The opening of this contact de-energizes solenoid A and stops the carriage. When the dogs 142, 142 are fully retracted the switch 342 in branch circuit 316 is closed and the cycle of operation is ready to be repeated as soon as the light beam is again interrupted.

An emergency stop button 352 is provided in branch circuit 307. If this button is opened, all branch circuits are de-energized except for branch circuits 334 and 332. All operations will stop and the dogs will raise to release any tire that may be on the awling table.

If desired, a mechanical cam timer may be employed in place of the timing relays to effect the sequential steps of operation.

What is claimed is:
1. Tire awling apparatus comprising,
   (a) a substantially horizontally disposed table for supporting a tire laid on its side,
   (b) a plurality of centering members normally disposed adjacent the outer peripheral portions of said table,
   (c) means for moving said centering members inwardly against the tire to center the tire on the table,
   (d) a plurality of clamping members normally disposed below the table beneath the opening circumscribed by the tire when centered on the table,
   (e) means for moving said clamping members upwardly above the table,
   (f) means for moving said clamping members radially outwardly against the inner edge of the tire,

(g) means for moving said clamping members downwardly toward the table whereby the inner edge portion of said tire is clamped to the table, (h) a plurality of awls annularly positioned beneath the table, and (i) means for driving said awls upwardly above the table partially into said tire as it is clamped to the table so as to perforate one side of the tire at spaced points above its inner edge portion.

2. Tire awling apparatus as set forth in claim 1 wherein said means for moving the clamping members comprise a vertically reciprocable support member on which the clamping members are mounted, pressure fluid actuated means for vertically reciprocating said support member, and additional pressure fluid actuated means carried by said support member for moving said clamping members radially inwardly and outwardly thereof.

3. Tire awling apparatus as set forth in claim 2 wherein the means for moving the centering members comprise pivotable bell cranks connected to the centering members and pressure fluid actuated means for simultaneously pivoting the bell cranks radially inwardly of the table.

4. Tire awling apparatus as set forth in claim 3 wherein said awls are positioned on said clamping members and said means for driving the awls comprise pressure fluid actuated means slidably secured to a second supporting table disposed below said horizontally disposed table.

References Cited in the file of this patent

UNITED STATES PATENTS

| | | | |
|---|---|---|---|
| 2,291,631 | Jorgensen | Aug. 4, | 1942 |
| 2,371,734 | Buttress | Mar. 20, | 1945 |
| 2,493,859 | Clarke | Jan. 10, | 1950 |
| 2,508,758 | Hollerith | May 23, | 1950 |
| 2,561,012 | Clark | July 17, | 1951 |
| 2,697,853 | Smyser | Dec. 28, | 1954 |